United States Patent
Zeng et al.

(10) Patent No.: US 12,233,550 B2
(45) Date of Patent: Feb. 25, 2025

(54) ROBOT CONTROL METHOD, ROBOT, AND COMPUTER-READABLE STORAGE MEDIUM

(71) Applicant: UBTECH ROBOTICS CORP LTD, Shenzhen (CN)

(72) Inventors: Xianwen Zeng, Shenzhen (CN); Yizhang Liu, Shenzhen (CN); Youjun Xiong, Shenzhen (CN)

(73) Assignee: UBTECH ROBOTICS CORP LTD, Shenzhen (TW)

( * ) Notice: Subject to any disclaimer, the term of this patent is extended or adjusted under 35 U.S.C. 154(b) by 225 days.

(21) Appl. No.: 17/994,394

(22) Filed: Nov. 28, 2022

(65) Prior Publication Data
US 2023/0166400 A1     Jun. 1, 2023

(30) Foreign Application Priority Data
Nov. 27, 2021    (CN) .......................... 202111426710.7

(51) Int. Cl.
     B25J 9/16          (2006.01)

(52) U.S. Cl.
     CPC .............. B25J 9/163 (2013.01); B25J 9/1653 (2013.01); B25J 9/1664 (2013.01)

(58) Field of Classification Search
     CPC ........ B25J 9/163; B25J 9/1653; B25J 9/1664; B25J 9/1602; B25J 9/1661; B25J 9/1679; B25J 18/00; Y02P 90/02

(Continued)

(56) References Cited

U.S. PATENT DOCUMENTS 5,355,064 A   *   10/1994   Yoshino ............... B62D 57/032
                                                               180/8.1
8,447,708 B2 *   5/2013   Sabe ..................... G06N 20/00
                                                               706/12

(Continued)

FOREIGN PATENT DOCUMENTS

EP            2933068 A1 * 10/2015   .......... B25J 11/0005

OTHER PUBLICATIONS

Do et al.; Linearization of dynamic equations for vibration and modal analysis of flexible joint manipulators, 2022; Elsevier; Mechanism and Machine Theory, vol. 167, https://doi.org/10.1016/j.mechmachtheory.2021.104516. (https://www.sciencedirect.com/science/article/pii/S0094114X2100 (Year: 2022).*

(Continued)

*Primary Examiner* — Jaime Figueroa

(57) ABSTRACT

A robot control method, a robot, and a computer-readable storage medium are provided. The method includes: obtaining a linear motion model of a robot; determining a predicted state corresponding to each moment in a preset time period based on the linear motion model; determining an expected state corresponding to each moment in the preset time period; and determining a compensation value of a velocity of joint(s) at each moment from k-th moment to k+N−1-th moment based on the predicted state corresponding to each moment in the preset time period and the expected state corresponding to each moment in the preset time period, determining instruction parameter(s) at the k-th moment based on the compensation value of the velocity of the joint(s) at the k-th moment, and adjusting a position of each of the joint(s) of the robot according to the instruction parameter(s) at the k-th moment.

20 Claims, 7 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 9,031,691 | B2* | 5/2015 | Yamane | B25J 9/1607 901/1 |
| 10,296,675 | B2* | 5/2019 | Li | G06F 30/20 |
| 10,678,210 | B2* | 6/2020 | Haddadin | B25J 9/1671 |
| 11,389,957 | B2* | 7/2022 | Romeres | G06N 3/006 |
| 2011/0112997 | A1* | 5/2011 | Sabe | G06N 20/00 706/12 |
| 2014/0249670 | A1* | 9/2014 | Yamane | B25J 9/1607 901/1 |
| 2015/0005941 | A1* | 1/2015 | Milenkovic | B62D 57/032 700/262 |
| 2017/0193137 | A1* | 7/2017 | Li | G06F 17/16 |
| 2018/0025664 | A1* | 1/2018 | Clarke | A63B 69/00 434/257 |
| 2018/0081340 | A1* | 3/2018 | Haddadin | G05B 19/4061 |
| 2019/0205145 | A1* | 7/2019 | Xiong | G06F 9/45512 |
| 2023/0166400 | A1* | 6/2023 | Zeng | B25J 9/1664 700/254 |

OTHER PUBLICATIONS

Cambera, J.C. and Feliu-Batlle, V., Input-state feedback linearization control of a single-link flexible robot arm moving under gravity and joint friction. 2017; Elsevier; Robotics and Autonomous Systems, 88, pp. 24-36. (Year: 2017).*

Koivo, A. and Guo, T.H., Adaptive linear controller for robotic manipulators. 1983; IEEE Transactions on Automatic Control, 28(2), pp. 162-171. (Year: 1983).*

* cited by examiner

ROBOT CONTROL METHOD, ROBOT, AND COMPUTER-READABLE STORAGE MEDIUM

CROSS REFERENCE TO RELATED APPLICATIONS

The present disclosure claims priority to Chinese Patent Application No. 202111426710.7, filed Nov. 27, 2021, which is hereby incorporated by reference herein as if set forth in its entirety.

BACKGROUND

1. Technical Field

The present disclosure relates to robot technology, and particularly to a robot control method, a robot, and a computer-readable storage medium.

2. Description of Related Art

At present, robots are used in more and more fields and can perform more complex actions such as cleaning tables and cleaning shoes. In the process of making a robot to perform a complex action, in order to improve the control accuracy of the robot, it is necessary to consider the position of the end of the robot and that of each joint at the same time. In the existing control method, it generally obtains the angle of each joint corresponding to the trajectory by calculating the inverse solution after obtaining the trajectory of the end of the robot. However, there is a contradiction between the positional adjustment of the end of the robot and that of each joint of the robot, that is, adjusting the position of the joint will affect that of the end, and problems such as physical constraints, singular configurations, and multi-solution switching will be caused during calculating the inverse solution, and the accuracy of the positional calculation will be affected. In order to improve the calculation accuracy, the method of calculating the inverse solution can be replaced by the method of optimization problem solving, but the differential motion model of the robot is a nonlinear motion model, and the process of optimization problem solving is a process of solving the nonlinear optimization problem which has a problem of low efficiency.

BRIEF DESCRIPTION OF THE DRAWINGS

To describe the technical schemes in the embodiments of the present disclosure or in the prior art more clearly, the following briefly introduces the drawings required for describing the embodiments or the prior art.

DETAILED DESCRIPTION

Figure 1:
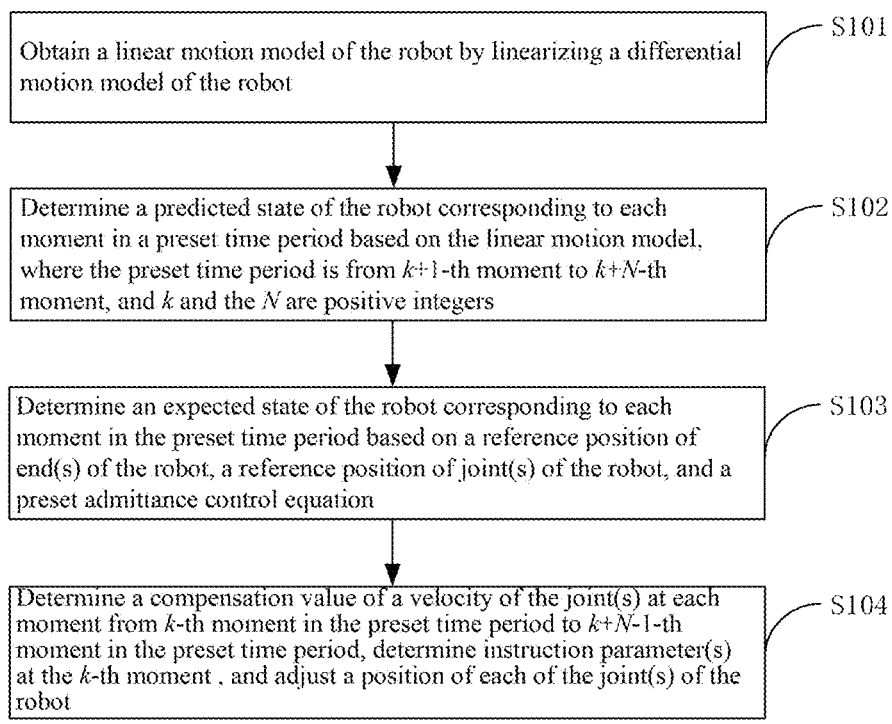
FIG. 1 is a flow chart of a robot control method according to an embodiment of the present disclosure.

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

In the existing control method for a robot, it generally obtains the angle of each joint corresponding to the trajectory by calculating the inverse solution after obtaining the trajectory of the end of the robot. However, there are problems such as physical constraints, singular configurations, and multi-solution switching during calculating the inverse solution, and the accuracy of the positional calculation will be affected. In order to improve the calculation accuracy, the method of calculating the inverse solution can be replaced by the method of optimization problem solving, but the differential motion model of the robot is a nonlinear motion model, and the process of optimization problem solving is a process of solving the nonlinear optimization problem which has a problem of low efficiency.

To this end, in the present disclosure, a control method of a robot is provided. In which, a linear motion model of a robot is obtained by linearizing a differential motion model of the robot, thereby transforming the problem solving during the movement of the robot into a linear problem solving. After that, by determining a predicted state of the robot corresponding to each moment in a preset time period based on the linear motion model; determining an expected state of the robot corresponding to each moment in the preset time period based on a reference position of end(s) of the robot, a reference position of joint(s) of the robot, and a preset admittance control equation; and determining a compensation value of a velocity of the joint(s) at each moment from k-th moment in the preset time period to k+N−1-th moment in the preset time period based on the predicted state corresponding to each moment in the preset time period and the expected state corresponding to each moment in the preset time period, determining instruction parameter(s) at the k-th moment based on the compensation value of the velocity of the joint(s) at the k-th moment, and adjusting a position of each of the joint(s) of the robot according to the instruction parameter at the k-th moment, so as to transform the problem solving during the movement of the robot into a linear optimization problem solving, thereby improving the computational accuracy and the computational efficiency.

FIG. 1 is a flow chart of a robot control method according to an embodiment of the present disclosure. A control method for a robot is provided. In this embodiment, the robot control method is a computer-implemented method executable for (a processor of) the robot (e.g., a robotic arm or a humanoid robot). In other embodiments, the method may be implemented through a robot control apparatus shown in FIG. 5 or a robot shown in FIG. 6. As shown in FIG. 1, the robot control method may include the following steps.

S101: obtaining a linear motion model of the robot by linearizing a differential motion model of the robot.

In this embodiment, the robot may be a robotic arm including a series of joints and an end. There is a correspondence $\dot{x}=J(\theta)\dot{\theta}$ between the velocity of the end and that of the joints at the same robotic arm, where $J(\theta)$ is a Jacobian matrix established according to the above-mentioned correspondence between the velocity of the end and that of the joints, $\dot{x}$ is the velocity of the end, $\theta$ is the positions of the joints which may be obtained through a position sensor (e.g., an encoder) disposed at the joint, and $\dot{\theta}$ is the velocity of the joint of the robot. It defines the state of the robot as X, $$X = \begin{bmatrix} x \\ \theta \end{bmatrix},$$

where x represents the position of the end of the robot which may be obtained through a position sensor (e.g., an encoder) disposed at the end, then the differential motion model of the robot will be $$\dot{X} = \begin{bmatrix} \dot{x} \\ \dot{\theta} \end{bmatrix} = \begin{bmatrix} J(\theta)\dot{\theta} \\ \dot{\theta} \end{bmatrix},$$

where $\dot{X}$ is the first derivative of the state X of the robot.

It defines that $\dot{X}=F(X,u)$, where $u=\dot{\theta}$ is the velocity of the joint of the robot. It takes the state of the robot at the last moment as the reference state $X_r$ at the current moment, and takes the velocity of the joints at the last moment as the reference velocity $u_r$ of the joint at the current moment, then $\dot{X}_r=F(X_r,u_r)$. By performing Taylor expansion on $\dot{X}=F(X,u)$ at $(X_r,u_r)$ and ignoring the higher order terms, it can get:

$$\dot{X} = F(X_r, u_r) + \frac{\partial F}{\partial X}\bigg|_{\substack{X=X_r \\ u=u_r}}(X - X_r) + \frac{\partial F}{\partial u}\bigg|_{\substack{X=X_r \\ u=u_r}}(u - u_r),$$

$$\text{where, } \frac{\partial F}{\partial X}\bigg|_{\substack{X=X_r \\ u=u_r}} = \begin{bmatrix} 0 & \frac{\partial J}{\partial \theta}\big|_{\theta_r} \cdot \dot{\theta}_r \\ 0 & 0 \end{bmatrix} = \begin{bmatrix} 0 & \dot{J}(\theta_r) \\ 0 & 0 \end{bmatrix}, \frac{\partial F}{\partial u}\bigg|_{\substack{X=X_r \\ u=u_r}} = \begin{bmatrix} J(\theta_r) \\ I \end{bmatrix}.$$

Let $$\frac{\partial F}{\partial X}\bigg|_{\substack{X=X_r \\ u=u_r}} = A(k) \text{ and } \frac{\partial F}{\partial u}\bigg|_{\substack{X=X_r \\ u=u_r}} = B(k),$$

it can get $\dot{X}=F(X_r, u_r)+A(k)(X-X_r)+B(k)(u-u_r)$, and further get $\dot{X}-\dot{X}_r=A(k)(X-X_r)+B(k)(u-u_r)$.

Let $\dot{X}-\dot{X}_r=\dot{\tilde{X}}$, $X-X_r=\tilde{X}$, and $u-u_r=\tilde{u}$, it can get $\dot{\tilde{X}}=A(k)\tilde{X}+B(k)\tilde{u}$. In which, $\dot{\tilde{X}}$ represents the difference between the first derivative of the state of the robot and the first derivative of the reference state, $\tilde{X}$ represents the difference between the state of the robot and the reference state. Since the reference state is the state of the previous moment, $\tilde{X}$ also represents the state change amount of the robot, and $\tilde{u}$ represents the difference between the velocity of the joint and the reference velocity of the joint.

By discretizing the forgoing equation, it can get $\tilde{X}(k+1)=(T_pA_k+I)\tilde{X}(k)+T_pB_k\tilde{u}(k)$. In which, $\tilde{X}(k+1)$ represents the state change amount at the k+1-th moment, $T_p$ represents the step size of prediction, $A_k$ and $B_k$ are both coefficients, I is the identity matrix, and $\tilde{X}(k)$ represents the state change amount at the k-th moment, $\tilde{u}(k)$ represents the difference between the velocity of the joint at the k-th moment and the reference velocity of the joint at the k-th moment and also represents the input variable at the k-th moment.

Let $T_pA_k+I=A_m(k)$ and $T_pB_k=B_m(k)$, it can get $\tilde{X}(k+1)=A_m(k)\tilde{X}(k)+B_m(k)\tilde{u}(k)$, that is, the linear motion model. The linear motion model represents a linear relationship among a state change amount at the k+1-th moment, a state change amount at the k-th moment, and an input variable at the k-th moment.

S102: determining a predicted state of the robot corresponding to each moment in a preset time period based on the linear motion model, where the preset time period is from k+1-th moment to k+N-th moment, and k and the N are positive integers.

In this embodiment, the current moment is the k-th moment. The state of the current moment may be predicted based on the state of the previous moment, then the predicted state corresponding to each moment may be obtained by predicting the states from the k+1-th moment to the k+N-th moment based on the linear motion model.

For example, if the linear motion model is $\tilde{X}(k+1)=A_m(k)\tilde{X}(k)+B_m(k)\tilde{u}(k)$, by analogizing the state change amount at the k+2-th moment according to the expression of the state change amount at the k+1-th moment, it can get:

$$\tilde{X}(k+2)=A_m(k+1)\tilde{X}(k+1)+B_m(k+1)\tilde{u}(k+1)=A_m(k+1)A_m(k)\tilde{X}(k)+A_m(k+1)B_m(k)\tilde{u}(k)+B_m(k+1)\tilde{u}(k+1)$$

where, $\tilde{X}(k+2)$ represents the state change amount at the k+2-th moment, $A_m(k+1)$ and $B_m(k+1)$ represent the coefficients corresponding to the k+2-th moment that are obtained by analogy. $\tilde{u}(k+1)$ represents the difference between the velocity of the joint at the k+1-th moment and the reference velocity of the joint at the time k+1-th moment. The reference velocity of the joint at the k+1-th moment is the velocity of the joint at the k-th moment, then $\tilde{u}(k+1)=u(k+1)-u(k)$ and $\tilde{u}(k)=u(k)-u(k-1)$. $u(k-1)$ is the velocity of the joint at time k−1-th moment, where $u(k)$ represents the velocity of the joint at the k-th moment, and $u(k+1)$ represents the velocity of the joint at the k+1-th moment.

Then, it can get by analogy that:

$$\tilde{X}(k+N) = A_m(k+N-1)\tilde{X}(k+N-1) + B_m(k+N-1)\tilde{u}(k+N-1) =$$
$$A_m(k+N-1)\ldots A_m(k)\tilde{X}(k) + A_m(k+N-1)\ldots A_m(k+1)B_m(k)\tilde{u}(k) +$$
$$A_m(k+N-1)\ldots A_m(k+1)B_m(k+2)\tilde{u}(k+1)\ldots +$$
$$B_m(k+N-1)\tilde{u}(k+N-1)$$

where, $\tilde{X}(k+N)$ represents the state change amount at the k+N-th moment, and $\tilde{u}(k+N-1)$ represents the difference between the velocity of the joint at the k+N−1-th moment and the reference velocity of the joint at the k+N−1-th moment, $A_m(k+N-1)$ and $B_m(k+N-1)$ represent the coefficients corresponding to the k+N-th moment that are obtained by analogy.

Let the coefficients corresponding to the state change amounts at the k+1-th moment, the k+2-th moment, ..., the k+N-th moment be equal to the coefficient at the k-th moment and are denoted as $A_{m,k}$ and $B_{m,k}$ then there is an equation of:

$$\begin{bmatrix} \tilde{X}(k+1) \\ \tilde{X}(k+2) \\ \dots \\ \tilde{X}(k+N) \end{bmatrix} = \begin{bmatrix} A_{m,k} \\ A_{m,k}^2 \\ \dots \\ A_{m,k}^N \end{bmatrix} \cdot \tilde{X}(k) +$$

$$\begin{bmatrix} B_{m,k} & & & \\ A_{m,k}B_{m,k} & B_{m,k} & & \\ \vdots & \vdots & \ddots & \\ A_{m,k}^{N-1}B_{m,k} & A_{m,k}^{N-2}B_{m,k} & \dots & B_{m,k} \end{bmatrix} \cdot \begin{bmatrix} \tilde{u}(k) \\ \tilde{u}(k+1) \\ \dots \\ \tilde{u}(k+N-1) \end{bmatrix}$$

Let $$\begin{bmatrix} \tilde{X}(k+1) \\ \tilde{X}(k+2) \\ \dots \\ \tilde{X}(k+N) \end{bmatrix} = X_{e\_expand}, \begin{bmatrix} A_{m,k} \\ A_{m,k}^2 \\ \dots \\ A_{m,k}^N \end{bmatrix} = A_{m\_expand},$$

$\tilde{X}(k) = X_e(k)$, $$\begin{bmatrix} B_{m,k} & & & \\ A_{m,k}B_{m,k} & B_{m,k} & & \\ \vdots & \vdots & \ddots & \\ A_{m,k}^{N-1}B_{m,k} & A_{m,k}^{N-2}B_{m,k} & \dots & B_{m,k} \end{bmatrix} = B_{m\_expand},$$

and $\begin{bmatrix} \tilde{u}(k) \\ \tilde{u}(k+1) \\ \dots \\ \tilde{u}(k+N-1) \end{bmatrix} = u_{e\_expand}$, then the above-mentioned equation may be expressed as $X_{e\_expand} = A_{m\_expand} \cdot X_e(k) + B_{m\_expand} \cdot u_{e\_expand}$. Therefore, $X_{e\_expand}$ represents the state change amount corresponding to each moment from the k+1-th moment to the k+N-th moment.

Then, according to:

$X(k+1) = \tilde{X}(k+1) + X(k)$ $X(k+2) = \tilde{X}(k+2) + X(k+1) = \tilde{X}(k+2) + \tilde{X}(k+1) + X(k), \dots$ $X(k+N) = \tilde{X}(k+N) + \tilde{X}(k+N-1) + \dots + \tilde{X}(k+1) + X(k)$ it may obtain the corresponding matrix as:

$$\begin{bmatrix} X(k+1) \\ X(k+2) \\ \dots \\ X(k+N) \end{bmatrix} = \begin{bmatrix} I & & & \\ I & I & & \\ \vdots & \vdots & \ddots & \\ I & I & \dots & I \end{bmatrix} \cdot \begin{bmatrix} \tilde{X}(k+1) \\ \tilde{X}(k+2) \\ \dots \\ \tilde{X}(k+N) \end{bmatrix} + X(k);$$

where $X(k)$ represents the predicted state at the k-th moment, $X(k+1)$ represents the predicted state at the k+1-th moment, $X(k+2)$ represents the predicted state at the k+2-th moment, and $X(k+N)$ represents the predicted state at the k+N-th moment, and $I$ represents the identity matrix.

Let $$\begin{bmatrix} X(k+1) \\ X(k+2) \\ \dots \\ X(k+N) \end{bmatrix} = X_{expand}, \begin{bmatrix} I & & & \\ I & I & & \\ \vdots & \vdots & \ddots & \\ I & I & \dots & I \end{bmatrix} = C_{m\_expand},$$

and $\begin{bmatrix} \tilde{X}(k+1) \\ \tilde{X}(k+2) \\ \dots \\ \tilde{X}(k+N) \end{bmatrix} = X_{e\_expand}$, then the above-mentioned matrix may be expressed as $X_{expand} = C_{m\_expand} \cdot X_{e\_expand} + X(k)$. Correspondingly, the predicted state corresponding to each moment from the k+1-th moment to the k+N-th moment may be represented as $X_{expand}$, where the k+1-th moment to the k+N-th moment is also called the prediction time domain.

S103: determining an expected state of the robot corresponding to each moment in the preset time period based on a reference position of end(s) of the robot, a reference position of joint(s) of the robot, and a preset admittance control equation.

Figure 2:
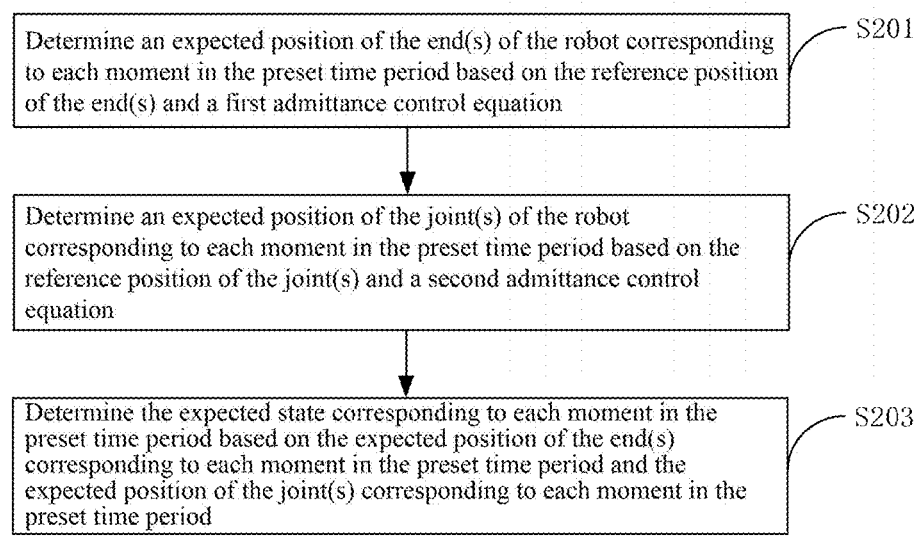
FIG. 2 is a flow chart of determining an expected state corresponding to each moment in a preset time period according to an embodiment of the present disclosure.

In this embodiment, the reference position of the end of the robot and that of the joint are substituted into the preset admittance control equation to obtain the expected state at the k-th moment, then the expected state corresponding to the k+1-th time to the k+N-th moment, that is, the expected state corresponding to each moment in the preset time period may be obtained based on the expected state at the k-th moment and the motion law of the robot FIG. 2 is a flow chart of determining an expected state corresponding to each moment in a preset time period according to an embodiment of the present disclosure. As shown in FIG. 2, in one embodiment, S103 may include the following steps.

S201: determining an expected position of the end(s) of the robot corresponding to each moment in the preset time period based on the reference position of the end(s) and a first admittance control equation.

In one embodiment, the first admittance control equation is a Cartesian space-based admittance control equation. For example, the first admittance control equation may be $M(\ddot{x}_c - \ddot{x}_r) + B(\dot{x}_c - \dot{x}_r) + K(x_c - x_r) = F$, where M represents the inertia matrix, B represents the damping matrix, K represents the stiffness matrix. The inertia matrix, the damping matrix and the stiffness matrix are all adjustable parameters, which can be determined according to the interaction characteristics of the expected values. $x_r$ represents the reference position of the end at the k-th moment, $x_c$ represents the expected position of the end at the k-th moment, $\dot{x}_c$ represents the first derivative of the expected position of the end at the k-th moment with respect to time, $\dot{x}_r$ represents the first derivative of the reference position of the end at the k-th moment with respect to time, $\ddot{x}_c$ is the second derivative of the expected position of the end at the k-th moment with respect to time, $\ddot{x}_r$ is the second derivative of the reference position of the end at the k-th moment with respect to time, and F is the force acting on the end. By inputting the inertia matrix, the damping matrix, the stiffness matrix, the reference position of the end corresponding to the k-th moment, and the force acting on the end into the first admittance control equation, the expected position of the end at the k-th moment can be obtained.

Figure 3:
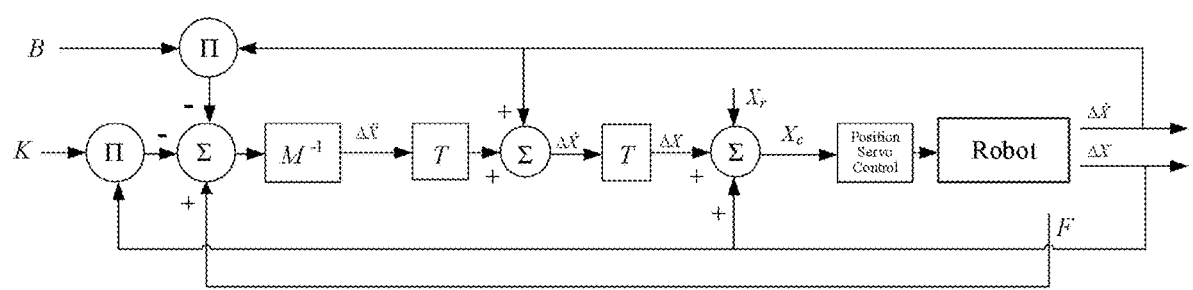
FIG. 3 is a schematic diagram of determining an expected position of an end at the k-th moment based on a first admittance control equation according to an embodiment of the present disclosure.

FIG. 3 is a schematic diagram of determining an expected position of an end at the k-th moment based on a first admittance control equation according to an embodiment of the present disclosure. As shown in FIG. 3, an example of the process of determining the expected position of the end at the k-th moment based on the first admittance control equation is provided. The inertia matrix, damping matrix, stiffness matrix, the reference position of the end at the k-th moment and the force acting on the end are calculated according to the calculation process shown in the figure to obtain the positional compensation value Δx. According to the formula $x_c = x_r + \Delta x$, the expected position of the end at the k-th moment can be obtained. In FIG. 3, Π represents a multiplication operation, Σ represents an addition operation, and T represents an integral operation.

After determining the expected position of the end at the k-th moment, the expected position of the end at the k-th moment is extended to obtain the expected positions of the end from the k+1-th moment to the k+N-th moment. For example, according to the formula $x_c(k+i) = x_{current} + \dot{x}_c \cdot T_{pre} \cdot i$, the expected positions of the end of the k+1-th moment to the k+N-th moment may be calculated, where i=1, 2, 3, ... N, $x_c(k+i)$ represents the expected position of the end at the k+i-th moment, $x_{current}$ represents the expected position of the end at the previous moment of the k+i-th moment, $\dot{x}_c$ represents the first derivative of the expected position of the end at the k-th moment with respect to time, that is, the expected velocity of the end at the k-th moment, and $T_{pre}$ represents the step size of prediction.

S202: determining an expected position of the joint(s) of the robot corresponding to each moment in the preset time period based on the reference position of the joint(s) and a second admittance control equation.

In one embodiment, the second admittance control equation is a joint space-based admittance control equation. For example, the second admittance control equation may be $M(\ddot{q}_c - \ddot{q}_r) + B(\dot{q}_c - \dot{q}_r) + K(q_c - q_r) = \tau$. In which, M represents the inertia matrix, B represents the damping matrix, and K represents the stiffness matrix. The inertia matrix, the damping matrix and the stiffness matrix in the second admittance control equation are all adjustable parameters, which are different from the inertia matrix, the damping matrix and the stiffness matrix in the first admittance control equation. $q_c$ represents the expected position of the joint at the k-th moment, $q_r$ represents the reference position of the joint at the k-th moment, $\dot{q}_c$ represents the first derivative of the expected position of the joint at the k-th moment with respect to time, and $\dot{q}_r$ represents the first derivative of the reference position of the joint at the k-th moment, $\ddot{q}_c$ is the second derivative of the expected position of the joint at the k-th moment with respect to time, $\ddot{q}_r$ is the second derivative of the reference position of the joint at the k-th moment, and τ is the force acting on the joint. By inputting the inertia matrix, the damping matrix, the stiffness matrix, the reference position of the joint at the k-th moment and the force acting on the joint into the second admittance control equation, the expected position of the joint at the k-th moment can be obtained.

After determining the expected position of the joint at the k-th moment, the expected position of the joint at the k-th moment may be extended to obtain the expected positions of the joint from the k+1-th moment to the k+N-th moment. For example, according to the formula $q_c(k+i) = q_{current} + \dot{q}_c \cdot T_{pre} \cdot i$, the expected positions of the joint from the k+1-th moment to the k+N-th moment may be calculated, where $q_c(k+i)$ represents the expected position of the joint at the k+i-th moment, $q_{current}$ represents the expected position of the joint at the previous moment of the k+i-th moment, and $\dot{q}_c$ represents the first derivative of the expected position of the joint at the k-th moment with respect to time, that is, the expected velocity of the joint at the k-th moment.

By determining the expected state through the Cartesian space-based admittance control equation and the joint space-based admittance control equation, the cooperative admittance of the Cartesian space and the joint space can be realized, thereby achieving the smooth interaction in the joint space without affecting the trajectory tracking and smooth interaction in the Cartesian space.

S203: determining the expected state corresponding to each moment in the preset time period based on the expected position of the end(s) corresponding to each moment in the preset time period and the expected position of the joint(s) corresponding to each moment in the preset time period.

In this embodiment, after obtaining the expected position of the end at the k-th moment and that of the joint at the k-th moment, the expected state at the k-th moment may be obtained as $$X_d = \begin{bmatrix} X_c \\ q_c \end{bmatrix}.$$

Correspondingly, the expected state from the k+1-th moment to the k+N-th moment may be expressed as $$X_d(k+i) = \begin{bmatrix} x_c(k+i) \\ q_c(k+i) \end{bmatrix},$$

that is $$X_d(k+i) = \begin{bmatrix} x_{current} + \dot{x}_c \cdot T_{pre} \cdot i \\ q_{current} + \dot{q}_c \cdot T_{pre} \cdot i \end{bmatrix},$$

where $X_d(k+i)$ represents the expected state at the k+i-th moment, i=1, 2, 3 ... N.

Let $$\begin{bmatrix} X_d(k+1) \\ X_d(k+2) \\ ... \\ X_d(k+N) \end{bmatrix} = X_{d\_expand},$$

where $X_{d\_expand}$ represents the expected state corresponding to each moment in the preset time period.

In the forgoing embodiment, by respectively determining the expected position of the end corresponding to each moment in the preset time period and that of the joint corresponding to each moment in the preset time period, the expected state corresponding to each moment in the preset time period can be determined based on the expected position of the end corresponding to each moment in the preset time period and that of the joint corresponding to each moment in the preset time period, thereby realizing the coordinated control of the end and joint of the robot, which reduces the problem of mutual restriction between the adjustment of the joint and that of the end.

S104: determining a compensation value of a velocity of the joint(s) at each moment from k-th moment in the preset time period to k+N−1-th moment in the preset time period based on the predicted state corresponding to each moment in the preset time period and the expected state corresponding to each moment in the preset time period, determining instruction parameter(s) at the k-th moment based on the compensation value of the velocity of the joint(s) at the k-th moment, and adjusting a position of each of the joint(s) of the robot according to the instruction parameter(s) at the k-th moment.

In which, the process of solving the instruction parameter(s) according to the predicted state and the expected state is a process of optimization problem solving. The instruction parameter(s) may be the instruction parameter(s) of the joints, or the instruction parameter(s) of the end. The instruction parameter(s) may be parameters such as velocity, acceleration, and position. The instruction parameter(s) at the k-th moment are used to input into the low layer controller of the robot, so that the low layer controller can adjust the position of the joint(s) of the robot according to the instruction parameter(s).

Figure 4:
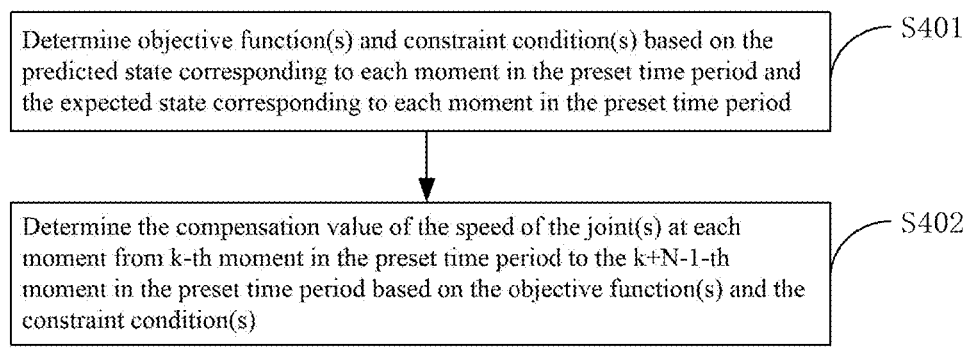
FIG. 4 is a flow chart of determining instruction parameters according to an embodiment of the present disclosure.

FIG. 4 is a flow chart of determining instruction parameters according to an embodiment of the present disclosure. As shown in FIG. 4, in one embodiment, the process of determining the compensation values of the velocity of the joint at each moment from the k-th moment to the k+N−1-th moment may include the following steps.

S401: determining objective function(s) and constraint condition(s) based on the predicted state corresponding to each moment in the preset time period and the expected state corresponding to each moment in the preset time period.

In one embodiment, the optimization problem solving of the instruction parameter(s) at the k-th moment may be performed using the model predictive control (MPC) algorithm, and the process of the optimization problem solving is in the process of solving the maximum or minimum value of the objective function(s) under the condition that the constraint condition(s) are satisfied. For example, the objective function(s) need to satisfy the tracking control of the predicted state to the expected state and avoid the sudden change of the velocity of the joint that is input by the system of the robot. Therefore, it is necessary to solve the minimum value of the difference between the expected state and the predicted state as well as the minimum value between the input velocity of the joint and the reference velocity of the joint.

In one embodiment, a weight coefficient may be determined based on a position tracking priority of the joint(s) and a position tracking priority of the end(s) first, and the objective function(s) may be determined based on the weight coefficient, the predicted state corresponding to each moment in the preset time period, and the expected state corresponding to each moment in the preset time period. In this embodiment, the weight coefficient x is in the form of $$X = \begin{bmatrix} X_x & \\ & X_q \end{bmatrix},$$

where $\chi_x$ is the control weight of the position tracking of the end, and $\chi_q$ is the control weight of the position tracking of the joint. When $\chi_x > \chi_q$, the high priority of the task of the position tracking of the end can be ensures. When $\chi_x < \chi_q$, it can make the task of the position tracking of the joint to be mapped to the null space of the trajectory tracking of the end, which ensures the high priority of the task of the position tracking of the joint, that is, the smoothness of the joint will not affect the trajectory tracking of the end and the smoothness of the end at all. The priority of the position tracking of the joint and that of the position tracking of the end is determined according to the task executed by the robot, then the values of $\chi_x$ and $\chi_q$ in the weight coefficient are determined. In the objective function, $\chi_x$ and $\chi_q$ in the weight coefficient are multiplied by the parameter corresponding to the end and that corresponding to the joint, respectively, thereby realizing the adjustments of the priority of the position tracking of the joint and that of the end, which further achieves the flexible control of the robot.

In one embodiment, the constraint condition(s) may include a range threshold of the predicted state corresponding to each moment in the preset time period, and a range threshold of the compensation value of the velocity of the joint(s) at each moment from the k-th moment to the k+N−1-th moment. In which, the compensation value of the velocity of the joint(s) at the k-th moment refers to the difference ũ(k) between the velocity of the joint at the k-th moment and the reference velocity of the joint at the k-th moment, and the compensation values of the velocity of the joint at each moment from the k-th moment to the k+N−1-th moment is $u_{e\_expand}$. By setting the range threshold of the predicted state and that of the compensation value of the velocity of the joint, the rationality of the obtained instruction parameter(s) can be improved, thereby avoiding the problem of instability of the robot caused by the sudden change of the instruction parameter(s).

For example, the objective function and the constraint may be set as:

$$\min_{w, u_{e\_expand}} J_k = \alpha \cdot \|\chi \cdot w\|_2 + \beta \cdot \|u_{e\_expand}\|_2$$

$$\text{s.t.} \quad X_{expand} - w = X_{d\_expand}$$
$$-\ddot{\theta}_{max} \cdot T \le u_{e\_expand} \le \ddot{\theta}_{max} \cdot T;$$
$$\underline{\theta} \le C_{m\_\theta\_expand} \cdot X_{expand} \le \overline{\theta}$$

where, $J_k$ represents the objective function, min represents calculating the minimum value, and s.t. represents the constraint. The process of optimization problem solving is a process of calculating the minimum value of $J_k$ under the condition that the constraint is satisfied. $\alpha$ and $\beta$ are the coefficients, and in general, $\alpha \gg \beta$. "$\| \, \|$" represents the norm, $\|\chi \cdot \omega\|_2 = \chi \cdot \Sigma_{i=1}^{N}(X_d(k+i)-X(k+i))-X(k+i))^2$, i=1, 2, 3, . . . , N, $\|u_{e\_expand}\|_2 = \Sigma_{i=0}^{N-1}((\tilde{u}(k+i))^2$, W represents the slack variable which is used to describe the error value between the predicted state and the expected state, $$X_{expand} = \begin{bmatrix} X(k+1) \\ X(k+2) \\ \dots \\ X(k+N) \end{bmatrix}, X_{d\_expand} = \begin{bmatrix} X_d(k+1) \\ X_d(k+2) \\ \dots \\ X_d(k+N) \end{bmatrix},$$

$$u_{e\_expand} = \begin{bmatrix} \tilde{u}(k) \\ \tilde{u}(k+1) \\ \dots \\ \tilde{u}(k+N-1) \end{bmatrix}, C_{m\_\theta\_expand} = \begin{bmatrix} O & I & & \\ & O & I & \\ & & \ddots & \\ & & & O & I \end{bmatrix},$$

where O represents the zero matrix, $\ddot{\theta}_{max}$ represents the limit of the acceleration of the joint, T represents the integration time length, $\underline{\theta}$ represents the upper limit of the position of the joint, and $\overline{\theta}$ represents the lower limit of the position of the joint.

S402: determining the compensation value of the velocity of the joint(s) at each moment from k-th moment in the preset time period to the k+N−1-th moment in the preset time period based on the objective function(s) and the constraint condition(s).

In this embodiment, in the case of satisfying the constraint condition(s), the minimum value of the objective function(s) is solved. When the objective function(s) is at the minimum value, the obtained $u_{e\_expand}$ is the output value, that is, the compensation value of the velocity of the joint at each moment from the k-th moment to the k+N−1-th moment.

In one embodiment, after determining the compensation value $u_{e\_expand}$ of the velocity of the joint at each moment from the k-th moment to the k+N−1-th moment, the first dimension $\tilde{u}(k)$ in $u_{e\_expand}$ is the compensation value $\tilde{u}(k)$ of the velocity of the joint at the k-th moment. The velocity of the joint at the k-th moment may be obtained based on the formula $u(k)=u(k-1)+\tilde{u}(k)$, and the velocity of the joint at the k-th moment may be used as the instruction parameter at the k-th moment, where $u(k-1)$ represents the velocity of the joint at the k−1-th moment. In addition, after obtaining the velocity of the joint at the k-th moment, it may also calculate the instruction position of the joint at the k-th moment based on the formula $q_i=q_{i\_last}+u(k) \cdot T_{ctrl}$ to use as the instruction parameter at the k-th moment, where represents the instruction position of the joint at the k-th moment, $q_{i\_last}$ represents the instruction position of the joint at the k−1-th moment, and $T_{ctrl}$ represents the control cycle.

By determining the objective function(s) and the constraint condition(s), determining the compensation value of the velocity of the joint(s) at the k-th moment according to the objective function(s) and the constraint condition(s), and determining the instruction parameter(s) at the k-th moment according to the compensation value of the velocity of the joint(s) at the k-th moment, the obtained instruction parameter(s) can adapt to the adjustment of the joint and that of the end simultaneously, thereby achieving the coordinated control of the end and the joint.

In this embodiment, a linear motion model of a robot is obtained by linearizing a differential motion model of the robot, thereby transforming the problem solving during the movement of the robot into a linear problem solving. After that, by determining a predicted state of the robot corresponding to each moment in a preset time period based on the linear motion model, where the preset time period is from k+1-th moment to k+N-th moment, and k and the N are positive integers; determining an expected state of the robot corresponding to each moment in the preset time period based on a reference position of end(s) of the robot, a reference position of joint(s) of the robot, and a preset admittance control equation; and determining a compensation value of a velocity of the joint(s) at each moment from k-th moment in the preset time period to k+N−1-th moment in the preset time period based on the predicted state corresponding to each moment in the preset time period and the expected state corresponding to each moment in the preset time period, determining instruction parameter(s) at the k-th moment based on the compensation value of the velocity of the joint(s) at the k-th moment, and adjusting a position of each of the joint(s) of the robot according to the instruction parameter at the k-th moment, so as to transform the problem solving during the movement of the robot into a linear optimization problem solving, thereby improving the computational accuracy and the computational efficiency.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 5:
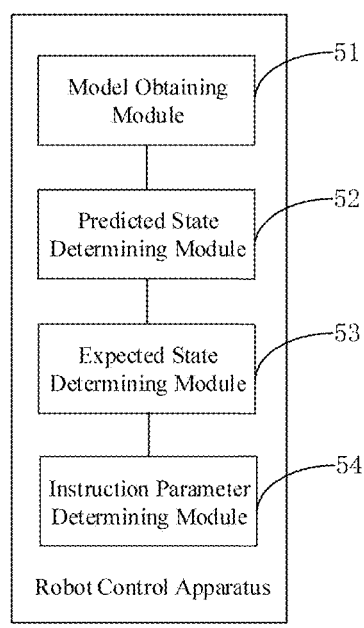
FIG. 5 is a schematic block diagram of a robot control apparatus according to an embodiment of the present disclosure.

FIG. 5 is a schematic block diagram of a robot control apparatus according to an embodiment of the present disclosure. In this embodiment, a robot control apparatus corresponding to the control method of the robot described in the forgoing embodiment that is for the above-mentioned robot is provided. For convenience of description, only the part related to this embodiment is shown. As shown in FIG. 5, the robot control apparatus may include:

a model obtaining module 51 configured to obtain a linear motion model of the robot by linearizing a differential motion model of the robot;

a predicted state determining module 52 configured to determine a predicted state of the robot corresponding to each moment in a preset time period based on the linear motion model, where the preset time period is from k+1-th moment to k+N-th moment, and k and the N are positive integers;

an expected state determining module 53 configured to determine an expected state of the robot corresponding to each moment in the preset time period based on a reference position of end(s) of the robot, a reference position of joint(s) of the robot, and a preset admittance control equation; and an instruction parameter determining module 54 configured to determine a compensation value of a velocity of the joint(s) at each moment from k-th moment in the preset time period to k+N−1-th moment in the preset time period based on the predicted state corresponding to each moment in the preset time period and the expected state corresponding to each moment in the preset time period, determine instruction parameter(s) at the k-th moment based on the compensation value of the velocity of the joint(s) at the k-th moment, and adjust a position of each of the joint(s) of the robot according to the instruction parameter(s) at the k-th moment.

In one embodiment, the linear motion model represents a linear relationship among a state change amount at the k+1-th moment, a state change amount at the k-th moment, and an input variable at the k-th moment, and the predicted state determining module 52 may be configured to:

determine a state change amount corresponding to each moment in the preset time period based on the linear motion model; and determine the predicted state corresponding to each moment in the preset time period according to the state change amount corresponding to each moment in the preset time period.

In one embodiment, the expected state determining module 53 may be configured to:

determine an expected position of the end(s) of the robot corresponding to each moment in the preset time period based on the reference position of the end(s) and a first admittance control equation;

determine an expected position of the joint(s) of the robot corresponding to each moment in the preset time period based on the reference position of the joint(s) and a second admittance control equation; and determine the expected state corresponding to each moment in the preset time period based on the expected position of the end(s) corresponding to each moment in the preset time period and the expected position of the joint(s) corresponding to each moment in the preset time period.

In one embodiment, the instruction parameter determining module 54 may be configured to:

determine objective function(s) and constraint condition(s) based on the predicted state corresponding to each moment in the preset time period and the expected state corresponding to each moment in the preset time period; and determine the compensation value of the velocity of the joint(s) at each moment from k-th moment in the preset time period to the k+N−1-th moment in the preset time period based on the objective function(s) and the constraint condition(s).

In one embodiment, the instruction parameter determining module 54 may be configured to:

determine a weight coefficient based on a position tracking priority of the joint(s) and a position tracking priority of the end(s); and determine the objective function(s) based on the weight coefficient, the predicted state corresponding to each moment in the preset time period, and the expected state corresponding to each moment in the preset time period.

In one embodiment, the instruction parameter determining module 54 may be configured to:

determine the velocity of the joint(s) at the k-th moment based on the compensation value of the velocity of the joint(s) at the k-th moment; and determine an instruction position of the joint(s) at the k-th moment based on the velocity of the joint(s) at the k-th moment and the instruction position of the joint(s) at the k−1-th moment, and using the instruction position of the joint(s) at the k-th moment as the instruction parameter(s) at the k-th moment.

It should be noted that, the information exchange, execution process and other contents between the above-mentioned device/units are based on the same concept as the method embodiments of the present disclosure. For the specific functions and technical effects, please refer to the method embodiments, which will not be repeated herein.

Figure 6:
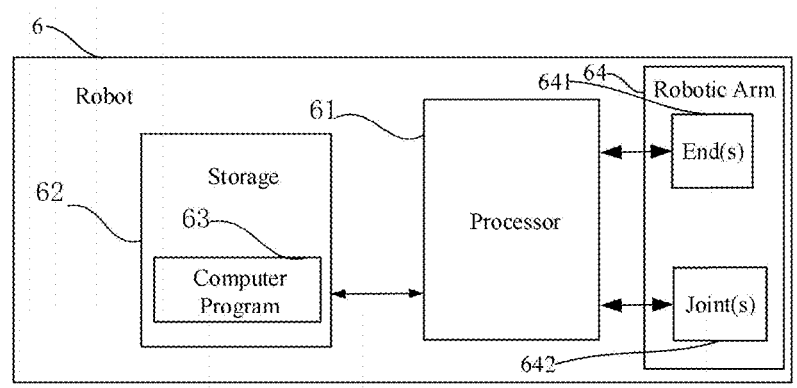
FIG. 6 is a schematic block diagram of a robot according to an embodiment of the present disclosure.
Figure 7:
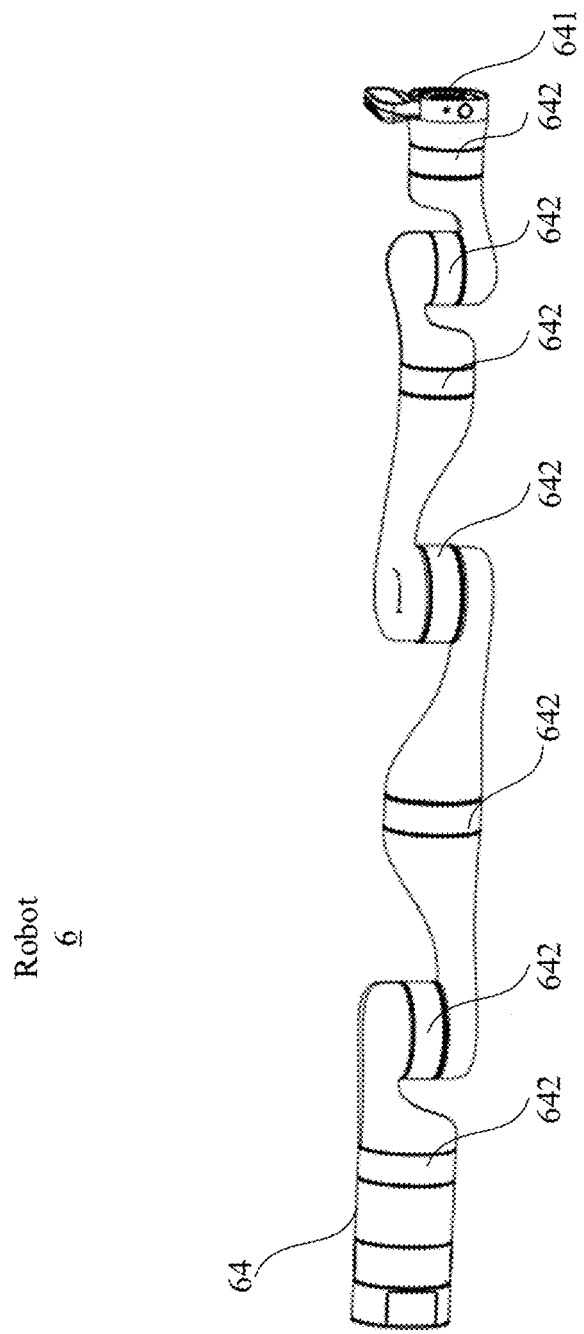
FIG. 7 is a schematic diagram of the robot of FIG. 6.

FIG. 6 is a schematic block diagram of a robot according to an embodiment of the present disclosure; and FIG. 7 is a schematic diagram of the robot of FIG. 6. As shown in FIG. 6 and FIG. 7, in this embodiment, a robot 6 (e.g., a robotic arm) is provided. The robot 6 includes a processor 61, a storage 62, a computer program 63 stored in the storage 62 and executable on the processor 61, and a robotic arm 64 having an end 641 and a plurality of joints 642. When executing (instructions in) the computer program 63, the processor 61 implements the steps in the above-mentioned embodiments of the robot control method, for example, steps S101-S104 shown in FIG. 1. Alternatively, when the processor 61 executes the (instructions in) computer program 63, the functions of each module/unit in the above-mentioned device embodiments, for example, the functions of the modules 51-54 shown in FIG. 5 are implemented.

For example, the computer program 63 may be divided into one or more modules/units, and the one or more modules/units are stored in the storage 62 and executed by the processor 61 to realize the present disclosure. The one or more modules/units may be a series of computer program instruction sections capable of performing a specific function, and the instruction sections are for describing the execution process of the computer program 63 in the robot 6.

It can be understood by those skilled in the art that FIG. 6 is merely an example of the robot 6 and does not constitute a limitation on the robot 6, and may include more or fewer components than those shown in the figure, or a combination of some components or different components. For example, the robot 6 may further include an input/output device, a network access device, a bus, and the like.

The processor 61 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 62 may be an internal storage unit of the robot 6, for example, a hard disk or a memory of the robot 6. The storage 62 may also be an external storage device of the robot 6, for example, a plug-in hard disk, a smart media card (SMC), a secure digital (SD) card, flash card, and the like, which is equipped on the robot 6. Furthermore, the storage 62 may further include both an internal storage unit and an external storage device, of the robot 6. The storage 62 is configured to store the computer program 63 and other programs and data required by the robot 6. The storage 62 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented control method for a robot, comprising:
   obtaining a linear motion model of the robot by linearizing a differential motion model of the robot;
   determining a predicted state of the robot corresponding to each moment in a preset time period based on the linear motion model, wherein the preset time period is from k+1-th moment to k+N-th moment, and k and the N are positive integers;
   determining an expected state of the robot corresponding to each moment in the preset time period based on a reference position of one or more ends of the robot, a reference position of one or more joints of the robot, and a preset admittance control equation; and
   determining a compensation value of a velocity of the one or more joints at each moment from k-th moment in the preset time period to k+N−1-th moment in the preset time period based on the predicted state corresponding to each moment in the preset time period and the expected state corresponding to each moment in the preset time period, determining one or more instruction parameters at the k-th moment based on the compensation value of the velocity of the one or more joints at the k-th moment, and adjusting a position of each of the one or more joints of the robot according to the one or more instruction parameters at the k-th moment.

2. The method of claim 1, wherein the linear motion model represents a linear relationship among a state change amount at the k+1-th moment, a state change amount at the k-th moment, and an input variable at the k-th moment, and the determining the predicted state of the robot corresponding to each moment in the preset time period based on the linear motion model comprises:
   determining a state change amount corresponding to each moment in the preset time period based on the linear motion model; and
   determining the predicted state corresponding to each moment in the preset time period according to the state change amount corresponding to each moment in the preset time period.

3. The method of claim 1, wherein the determining the expected state of the robot corresponding to each moment in the preset time period based on the reference position of the one or more ends of the robot, the reference position of the one or more joints of the robot, and the preset admittance control equation comprises:
   determining an expected position of the one or more ends of the robot corresponding to each moment in the preset time period based on the reference position of the one or more ends and a first admittance control equation;
   determining an expected position of the one or more joints of the robot corresponding to each moment in the preset time period based on the reference position of the one or more joints and a second admittance control equation; and
   determining the expected state corresponding to each moment in the preset time period based on the expected position of the one or more ends corresponding to each moment in the preset time period and the expected position of the one or more joints corresponding to each moment in the preset time period.

4. The method of claim 1, wherein the determining the compensation value of the velocity of the one or more joints at each moment from k-th moment in the preset time period to the k+N−1-th moment in the preset time period based on the predicted state corresponding to each moment in the preset time period and the expected state corresponding to each moment in the preset time period comprises:
   determining one or more objective functions and one or more constraint conditions based on the predicted state corresponding to each moment in the preset time period and the expected state corresponding to each moment in the preset time period; and
   determining the compensation value of the velocity of the one or more joints at each moment from k-th moment in the preset time period to the k+N−1-th moment in the preset time period based on the one or more objective functions and the one or more constraint conditions.

5. The method of claim 4, wherein the determining the one or more objective functions and the one or more constraint conditions based on the predicted state corresponding to each moment in the preset time period and the expected state corresponding to each moment in the preset time period comprises:
- determining a weight coefficient based on a position tracking priority of the one or more joints and a position tracking priority of the one or more ends; and
- determining the one or more objective functions based on the weight coefficient, the predicted state corresponding to each moment in the preset time period, and the expected state corresponding to each moment in the preset time period.

6. The method of claim 4, wherein the one or more constraint conditions include a range threshold of the predicted state corresponding to each moment in the preset time period, and a range threshold of the compensation value of the velocity of the one or more joints at each moment from the k-th moment to the k+N−1-th moment.

7. The method of claim 1, wherein the determining the one or more instruction parameters at the k-th moment based on the compensation value of the velocity of the one or more joints at the k-th moment comprises:
- determining the velocity of the one or more joints at the k-th moment based on the compensation value of the velocity of the one or more joints at the k-th moment; and
- determining an instruction position of the one or more joints at the k-th moment based on the velocity of the one or more joints at the k-th moment and the instruction position of the one or more joints at the k−1-th moment, and using the instruction position of the one or more joints at the k-th moment as the one or more instruction parameters at the k-th moment.

8. A robot, comprising:
- one or more ends;
- one or more joints;
- a processor;
- a memory coupled to the processor; and
- one or more computer programs stored in the memory and executable on the processor;
- wherein, the one or more computer programs comprise:
- instructions for obtaining a linear motion model of the robot by linearizing a differential motion model of the robot;
- instructions for determining a predicted state of the robot corresponding to each moment in a preset time period based on the linear motion model, wherein the preset time period is from k+1-th moment to k+N-th moment, and k and the N are positive integers;
- instructions for determining an expected state of the robot corresponding to each moment in the preset time period based on a reference position of the one or more ends of the robot, a reference position of the one or more joints of the robot, and a preset admittance control equation; and
- instructions for determining a compensation value of a velocity of the one or more joints at each moment from k-th moment in the preset time period to k+N−1-th moment in the preset time period based on the predicted state corresponding to each moment in the preset time period and the expected state corresponding to each moment in the preset time period, determining one or more instruction parameters at the k-th moment based on the compensation value of the velocity of the one or more joints at the k-th moment, and adjusting a position of each of the one or more joints of the robot according to the one or more instruction parameters at the k-th moment.

9. The robot of claim 8, wherein the linear motion model represents a linear relationship among a state change amount at the k+1-th moment, a state change amount at the k-th moment, and an input variable at the k-th moment, and the instructions for determining the predicted state of the robot corresponding to each moment in the preset time period based on the linear motion model comprise:
- instructions for determining a state change amount corresponding to each moment in the preset time period based on the linear motion model; and
- instructions for determining the predicted state corresponding to each moment in the preset time period according to the state change amount corresponding to each moment in the preset time period.

10. The robot of claim 8, wherein the instructions for determining the expected state of the robot corresponding to each moment in the preset time period based on the reference position of the one or more ends of the robot, the reference position of the one or more joints of the robot, and the preset admittance control equation comprise:
- instructions for determining an expected position of the one or more ends of the robot corresponding to each moment in the preset time period based on the reference position of the one or more ends and a first admittance control equation;
- instructions for determining an expected position of the one or more joints of the robot corresponding to each moment in the preset time period based on the reference position of the one or more joints and a second admittance control equation; and
- instructions for determining the expected state corresponding to each moment in the preset time period based on the expected position of the one or more ends corresponding to each moment in the preset time period and the expected position of the one or more joints corresponding to each moment in the preset time period.

11. The robot of claim 8, wherein the instructions for determining the compensation value of the velocity of the one or more joints at each moment from k-th moment in the preset time period to the k+N−1-th moment in the preset time period based on the predicted state corresponding to each moment in the preset time period and the expected state corresponding to each moment in the preset time period comprise:
- instructions for determining one or more objective functions and one or more constraint conditions based on the predicted state corresponding to each moment in the preset time period and the expected state corresponding to each moment in the preset time period; and
- instructions for determining the compensation value of the velocity of the one or more joints at each moment from k-th moment in the preset time period to the k+N−1-th moment in the preset time period based on the one or more objective functions and the one or more constraint conditions.

12. The robot of claim 11, wherein the instructions for determining the one or more objective functions and the one or more constraint conditions based on the predicted state corresponding to each moment in the preset time period and the expected state corresponding to each moment in the preset time period comprise:

instructions for determining a weight coefficient based on a position tracking priority of the one or more joints and a position tracking priority of the one or more ends; and instructions for determining the one or more objective functions based on the weight coefficient, the predicted state corresponding to each moment in the preset time period, and the expected state corresponding to each moment in the preset time period.

13. The robot of claim 11, wherein the one or more constraint conditions include a range threshold of the predicted state corresponding to each moment in the preset time period, and a range threshold of the compensation value of the velocity of the one or more joints at each moment from the k-th moment to the k+N−1-th moment.

14. The robot of claim 8, wherein the instructions for determining the one or more instruction parameters at the k-th moment based on the compensation value of the velocity of the one or more joints at the k-th moment comprise:

instructions for determining the velocity of the one or more joints at the k-th moment based on the compensation value of the velocity of the one or more joints at the k-th moment; and instructions for determining an instruction position of the one or more joints at the k-th moment based on the velocity of the one or more joints at the k-th moment and the instruction position of the one or more joints at the k−1-th moment, and using the instruction position of the one or more joints at the k-th moment as the one or more instruction parameters at the k-th moment.

15. A non-transitory computer-readable storage medium for storing one or more computer programs, wherein the one or more computer programs comprise:

instructions for obtaining a linear motion model of a robot by linearizing a differential motion model of the robot;

instructions for determining a predicted state of the robot corresponding to each moment in a preset time period based on the linear motion model, wherein the preset time period is from k+1-th moment to k+N-th moment, and k and the N are positive integers;

instructions for determining an expected state of the robot corresponding to each moment in the preset time period based on a reference position of one or more ends of the robot, a reference position of one or more joints of the robot, and a preset admittance control equation; and instructions for determining a compensation value of a velocity of the one or more joints at each moment from k-th moment in the preset time period to k+N−1-th moment in the preset time period based on the predicted state corresponding to each moment in the preset time period and the expected state corresponding to each moment in the preset time period, determining one or more instruction parameters at the k-th moment based on the compensation value of the velocity of the one or more joints at the k-th moment, and adjusting a position of each of the one or more joints of the robot according to the one or more instruction parameters at the k-th moment.

16. The storage medium of claim 15, wherein the linear motion model represents a linear relationship among a state change amount at the k+1-th moment, a state change amount at the k-th moment, and an input variable at the k-th moment, and the instructions for determining the predicted state of the robot corresponding to each moment in the preset time period based on the linear motion model comprise:

instructions for determining a state change amount corresponding to each moment in the preset time period based on the linear motion model; and instructions for determining the predicted state corresponding to each moment in the preset time period according to the state change amount corresponding to each moment in the preset time period.

17. The storage medium of claim 15, wherein the instructions for determining the expected state of the robot corresponding to each moment in the preset time period based on the reference position of the one or more ends of the robot, the reference position of the one or more joints of the robot, and the preset admittance control equation comprise:

instructions for determining an expected position of the one or more ends of the robot corresponding to each moment in the preset time period based on the reference position of the one or more ends and a first admittance control equation;

instructions for determining an expected position of the one or more joints of the robot corresponding to each moment in the preset time period based on the reference position of the one or more joints and a second admittance control equation; and instructions for determining the expected state corresponding to each moment in the preset time period based on the expected position of the one or more ends corresponding to each moment in the preset time period and the expected position of the one or more joints corresponding to each moment in the preset time period.

18. The storage medium of claim 15, wherein the instructions for determining the compensation value of the velocity of the one or more joints at each moment from k-th moment in the preset time period to the k+N−1-th moment in the preset time period based on the predicted state corresponding to each moment in the preset time period and the expected state corresponding to each moment in the preset time period comprise:

instructions for determining one or more objective functions and one or more constraint conditions based on the predicted state corresponding to each moment in the preset time period and the expected state corresponding to each moment in the preset time period; and instructions for determining the compensation value of the velocity of the one or more joints at each moment from k-th moment in the preset time period to the k+N−1-th moment in the preset time period based on the one or more objective functions and the one or more constraint conditions.

19. The storage medium of claim 17, wherein the instructions for determining the one or more objective functions and the one or more constraint conditions based on the predicted state corresponding to each moment in the preset time period and the expected state corresponding to each moment in the preset time period comprise:

instructions for determining a weight coefficient based on a position tracking priority of the one or more joints and a position tracking priority of the one or more ends; and instructions for determining the one or more objective functions based on the weight coefficient, the predicted state corresponding to each moment in the preset time period, and the expected state corresponding to each moment in the preset time period.

20. The storage medium of claim 18, wherein the one or more constraint conditions include a range threshold of the predicted state corresponding to each moment in the preset time period, and a range threshold of the compensation value of the velocity of the one or more joints at each moment from the k-th moment to the k+N−1-th moment.

* * * * *